P. A. RITTER.
SAFETY DEVICE.
APPLICATION FILED MAR. 6, 1915. RENEWED DEC. 12, 1918.
1,311,774.
Patented July 29, 1919.
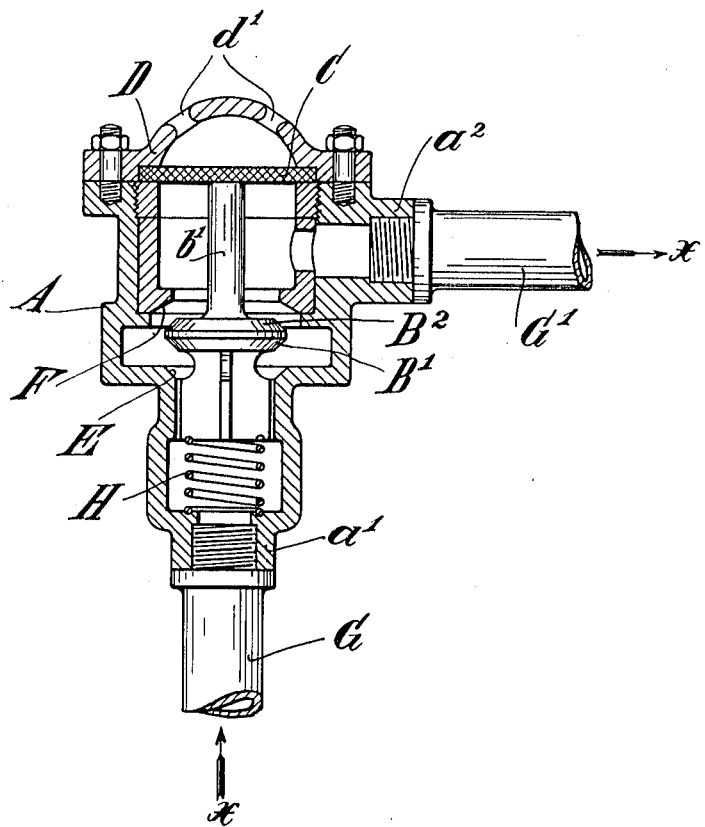

UNITED STATES PATENT OFFICE.

PAUL A. RITTER, OF KIEL, GERMANY, ASSIGNOR TO FRIED. KRUPP AKTIENGESELLSCHAFT GERMANIAWERFT, OF KIEL-GAARDEN, GERMANY.

SAFETY DEVICE.

1,311,774. Specification of Letters Patent. Patented July 29, 1919.

Application filed March 6, 1915, Serial No. 12,622. Renewed December 12, 1918. Serial No. 266,515.

*To all whom it may concern:*

Be it known that I, PAUL A. RITTER, a citizen of the German Empire, residing at Kiel, Germany, have invented certain new and useful Improvements in Safety Devices, of which the following is a specification.

The present invention is a safety device adapted for use in fluid conveying conduits, such for instance, as the compressed air injection conduit of an internal combustion engine. The main objects of my invention are to prevent the transmission of high back pressure through the conduit, as for instance, in case of an explosion in the fuel valve; to relieve such back pressure without damage to the apparatus, as for instance, by the rupturing of an inexpensive readily replaced closure, and to prevent the escape of the high pressure air in case the closure is ruptured by such an explosion or some other cause.

One embodiment of the invention is illustrated in the accompanying drawing showing a longitudinal section of the device.

The safety device is inclosed in the housing A which is inserted in the compressed air injection conduit G G¹ of the internal combustion engine by means of sockets $a^1$ $a^2$ at a suitable place between the compressed air injecting tank (not shown) and the injecting valve (not shown), and through this housing the compressed air proceeds in the direction of the arrows $x$. Between the sockets $a^1$ $a^2$ is arranged a double seated valve B¹ B² in the housing A, the valve disk of which is provided with a cylindrical extension $b^1$ by means of which it abuts against a rupture plate C under the action of a weak spring H seated beneath the valve, and also by the current of the injection air. The length of the extension $b^1$ has been so selected that the valve is held by means of the rupture plate C between its two seat surfaces E and F in the middle position corresponding to the greatest opening of the valve. The rupture plate C is held secure in its position, by means of an arched cap D provided with openings $d^1$, and closing the interior of the housing A against the atmosphere.

Should an explosion occur in the fuel valve, the valve B¹ will then first be thrown against its lower seat E actuated by the explosion pressure which is communicated through the conduit G¹, and as a consequence a check is provided for the further and very dangerous transmission of the explosion into the injection tank. Should the explosion pressure reach such a magnitude that the injection valve or the conduit connected therewith should be endangered, the rupture plate C which is made of brittle material such as cast iron or the like and has suitable dimensions, will be broken, and the explosion gases may thereupon escape through the openings $d^1$. The pressure above the valve B² will thereupon naturally sink rapidly, and the forces acting on the underside of the valve B¹, namely, the current of the compressed air and the spring H will gain the upper hand and throw the valve B² against its seat F. This will prevent the injecting air to escape unnecessarily through the rupture brake plate C and the openings $d^1$. A lowering of the pressure in the injecting air tank can therefore not occur. Furthermore, in case of an explosion in connection with one cylinder of a multiple cylinder machine, the cylinders of which are connected to the same source of compressed air, the other cylinders may continue to work without any interruption.

The exchange of a broken rupture plate C may be easily accomplished after stopping the corresponding fuel pump and the fuel valve.

The double seated valve B¹ B² may also be replaced by two single valves.

I claim:—

1. A safety device for compressed air injection conduits of internal combustion engines, comprising a conduit, closing means adapted to respond to the pressure of incoming air and close the conduit against the admission of air and also adapted to move in the opposite direction in response to the back pressure of an explosion in the conduit and thereby check the back-flow of gases of explosion into the air conduit, and a frangible member adapted to be broken by such an explosion, normally arresting movement of the closing member in the direction of incoming air and preventing its closing in said direction.

2. A safety device for compressed air injection conduits of internal combustion engines; said safety device comprising a closing means adapted to close the conduit in one direction when moving under the pressure of incoming air, and adapted to close the conduit in the other direction under the back pressure of an explosion; and a frangible member adapted to be broken by the pressure of such an explosion, positioned to arrest movement of the closing means under the pressure of incoming air and hold it from closing in that position; said closing means resting normally against said frangible means and away from its closed position in said other direction, and being thereby normally fixed in an intermediate open position, ready to move to its position for cutting off the flow of air as soon as frangible member is broken.

3. A safety device for compressed air injection conduits of internal combustion engines, comprising a conduit, a valve housing in said conduit, a valve and a seat therefor acting in opposition to the air current to close the conduit, a second valve acting with the air current to close the conduit, and means including a rupture plate and a spring for normally holding said valve in open fixed position.

4. A safety device for compressed air injection conduits of internal combustion engines, a conduit, a valve housing in said conduit, a double acting valve in the housing, said housing having seats for opposing positions of said valve, means including a rupture plate and a spring for holding said valve in a fixed central position between the two seats.

5. A safety device for compressed air injection conduits of internal combustion engines, a conduit, a valve housing in said conduit, a double acting valve in the housing, said housing having seats for opposing positions of said valve, means for holding said valves centrally and fixedly between the two seats, said means comprising a spring acting with the air current and a rupture plate acting against the air current on said valve.

6. A safety device for compressed air injection conduits of internal combustion engines, a conduit, a valve housing in said conduit, a double acting valve in the housing, said housing having seats for opposing positions of said valve, means for holding said valve centrally and fixedly between the two seats, said means comprising a spring acting with the air current and a rupture plate acting against the air current on said valve, said rupture plate being made of brittle material and covering air vents provided in the housing, thus opening communication with the atmosphere on the rupture of said plate.

7. A safety device adapted for use in fluid conveying conduits, including a valve adapted to move from normally open position in either direction to closed position, and a rupturable member normally preventing the movement of the valve to one closed position and in the direction of normal fluid flow.

8. A safety device adapted for use in fluid conveying conduits, including a valve adapted to move from normally open position in either direction to closed position, and a rupturable member normally holding the valve open against the normal fluid flow and normally preventing direct discharge of the fluid to the atmosphere, and adapted to break upon a predetermined increase in back pressure on the delivery side of the valve and thereafter permit the movement of the valve to closed position in the direction of the normal fluid flow and thereby prevent escape of fluid through the ruptured member.

9. A safety device adapted for use in fluid conveying conduits, including a valve, a closure on the delivery side of the conduit normally preventing direct discharge of fluid from the conduit to the atmosphere and normally holding the valve in open position, said closure adapted to open upon a predetermined back pressure on the delivery side of the valve and when opened permitting the movement of the valve to closed position upon the relief of the back pressure, thereby preventing direct escape to the atmosphere of fluid from the supply side of the valve.

In testimony whereof the foregoing specification is signed in the presence of two witnesses.

PAUL A. RITTER.

Witnesses:
  JULIUS RÖPKE,
  HERMANN SCHÜTT.